United States Patent [19]
Kondo et al.

[11] Patent Number: 5,734,441
[45] Date of Patent: Mar. 31, 1998

[54] APPARATUS FOR DETECTING A MOVEMENT VECTOR OR AN IMAGE BY DETECTING A CHANGE AMOUNT OF AN IMAGE DENSITY VALUE

[75] Inventors: Toshiaki Kondo, Atsugi; Masayoshi Sekine, Tokyo, both of Japan

[73] Assignee: Canon Kabushiki Kaisha, Tokyo, Japan

[21] Appl. No.: 402,990

[22] Filed: Mar. 13, 1995

Related U.S. Application Data

[63] Continuation of Ser. No. 131,912, Oct. 4, 1993, abandoned, which is a continuation of Ser. No. 799,053, Nov. 27, 1991, abandoned.

[30] Foreign Application Priority Data

Nov. 30, 1990 [JP] Japan .................................. 2-333838
Jun. 21, 1991 [JP] Japan .................................. 3-150319

[51] Int. Cl.$^6$ ................................................ H04N 5/14
[52] U.S. Cl. .......................... 348/700; 348/208; 348/699; 382/107
[58] Field of Search ........................ 348/208, 699–701, 348/135, 143, 152, 169; 382/107, 103

[56] References Cited

U.S. PATENT DOCUMENTS

| | | | |
|---|---|---|---|
| 4,364,089 | 12/1982 | Woolfson | 358/126 X |
| 4,692,806 | 9/1987 | Anderson et al. | 358/126 X |
| 4,805,018 | 2/1989 | Nishimura et al. | 358/125 X |
| 5,012,270 | 4/1991 | Sekine et al. | 358/222 X |
| 5,018,215 | 5/1991 | Nasr et al. | 358/125 X |
| 5,034,986 | 7/1991 | Karmann et al. | 358/126 X |
| 5,053,276 | 10/1991 | Blissett et al. | 358/222 |
| 5,103,305 | 4/1992 | Watanabe | 358/105 |
| 5,128,754 | 7/1992 | Dhein | 358/105 |
| 5,173,770 | 12/1992 | Kondo et al. | 358/105 |
| 5,189,513 | 2/1993 | Sekine et al. | 358/105 |
| 5,296,925 | 3/1994 | Kondo et al. | 348/208 |
| 5,386,264 | 1/1995 | Sekine et al. | 354/430 |
| 5,596,366 | 1/1997 | Takashima et al. | 348/208 |

*Primary Examiner*—Victor R. Kostak
*Attorney, Agent, or Firm*—Fitzpatrick, Cella, Harper & Scinto

[57] ABSTRACT

A movement vector detection apparatus includes a detecting circuit for detecting a movement vector of an image in accordance with the amount of change in an image density value over a determined time at an arbitrary position of an image and a space gradient of an image signal at the arbitrary position, and a setting circuit for suitably setting a dimension and a shape of a unit operation area to output the movement vector in response to a space frequency of the input image.

36 Claims, 8 Drawing Sheets

APPARATUS FOR DETECTING A MOVEMENT VECTOR OR AN IMAGE BY DETECTING A CHANGE AMOUNT OF AN IMAGE DENSITY VALUE

This application is a continuation of application Ser. No. 08/131,912 filed Oct. 4, 1993, which is a continuation of Ser. No. 07/799,053, filed Nov. 27, 1991, both now abandoned.

BACKGROUND OF THE INVENTION

1. Field of the Invention

The present invention is related to a movement vector detection apparatus using an image signal, which can be suitably applied to vibration-proof an image pick-up device, e.g. a video camera, an electronic camera, an electronic still camera, and to follow-up of a camera subject.

2. Related Background Art

In the field of image pick-up devices such as a camera, multifunctionalization and automation of the device have occurred and include, for example, automatic focusing control, automatic exposure control, automatic vibration-proof control, and so on. Techniques for such controls have changed from using an independent sensor system for each function to extracting signal components used as parameters for each control function from an image signal based on a photographed image. This means that the system is made more intelligent by conducting all controls using the image signal output from an image pick-up means.

Under such circumstances, an image pick-up device such as a camera requires accurate, high-precision detection of motion of the image to implement automatic vibration-proof control. This is also the case for implementing automatic focusing control in order to obtain high precision control.

Various methods are used for detecting image motion. One method detects a movement vector from corresponding image signals in a detecting area, called hereinafter a block, set in a screen for the movement vector detection, since it makes possible the fine detection with high-precision of even a complex motion.

The time space gradient method is known to obtain the movement vector, and is described, for instance, in U.S. Pat. No. 3,890,462, Japanese Patent Publication No. 60-46878, J. O. Limb and J. A. Murphy "Measuring the Speed of Moving Object from Television Signals" and IEEE Trans. Com., Com-23 pp. 474–478 April 1975.

In the time space gradient method, an amount of movement of each position is calculated by the following fundamental formulae.

$$\alpha = \Sigma_B d \cdot \text{sign}(g'_x) / \Sigma_B |g'_x|,$$

$$\beta = \Sigma_B d \cdot \text{sign}(g'_y) / \Sigma_B |g'_y|.$$

In these formulae, $\alpha$ and $\beta$ stand for movement amounts in the x- and y-directions, respectively, d represents the density difference between chronologically sequential images at the same position, and $g'_x$, $g'_y$ represent space gradients in the x- and y-directions, respectively when the image is represented by g. Further, $\Sigma_B$ denotes a summation operation in a block of a unit operation area composed of plural pixels and sign ( ) represents a function for outputting the sign of $g'_x$ or $g'_y$.

The dimension and the shape of the block are fixed for every input image.

In the above-explained conventional method, the fixed dimension and shape of the block cause the defect of extremely poor accuracy in the low space frequency area of image, since information is insufficient in the block about the space gradient necessary for proper operation.

On the other hand, it is observed in the high space frequency area of the image that the space resolution is restricted to detect the movement vector under the fixed dimension and shape of the block. This is because the detection range is narrowed due to the fine period of the image. A large block is unnecessary for such a condition, so that the fixation of dimension and shape inevitably brings this defect.

In addition to the above time space gradient method, other methods for detecting movement vector by the image signal processing include the mutual correlation function method to calculate the mutual correlation function coefficient, $h(\xi, \eta)$, and the matching method to calculate the sum of the absolute values of the differences between two images, called hereinafter the residual difference.

The defined formula to calculate the mutual correlation function coefficient is as follows:

$$h(\xi, \eta) = \iint g_0(x-\xi, y-\eta) \cdot g_1(x,y) dx dy,$$

wherein $g_0(x, y) \cdot g_1(x, y)$ represents two images and $\xi, \eta$ represent amounts between the two images. The coefficient, $h(\xi, \eta)$, becomes a maximum when the two images coincide with each other and exponentially reduces as the images are made separate.

For the matching method, the residual difference, $e(\xi, \eta)$, is calculated as follows:

$$e(\xi, \eta) = \Sigma_B |g_0(x-\xi, y-\eta) \cdot g_1(x,y)|,$$

wherein the subscript B is called as block to show the region of summation. This method is also called the block matching method or the template matching method, since degrees of similarity and alignment of two images are computed per unit block. Summation of the squares of the differences may be employed as well as the above-described absolute value summation of the differences between pixels, in order to define the residual difference showing the disagreement or nonalignment between the two images. The dimension and the shape of the block are also fixed for every input image.

These methods also have the same defects as the time space gradient method because of the fixed dimension and shape of the detection block. These defects include a great reduction of accuracy in the low space frequency area of the image with a lack of image information for the correlation function calculation in the block, and restricted space resolution for the movement vector detection in the high space frequency area of the image with a narrowed detection range under the influence of the fine period of the image.

SUMMARY OF THE INVENTION

The present invention provide a solution to the above-explained problems in the conventional methods. The first purpose of the present invention is to provide a movement vector detection apparatus which can detect space gradient information of the image with high precision in response to an input image.

The second purpose of the present invention is to provide a movement vector detection apparatus which can effectively use the space gradient information of the image. The apparatus automatically sets the block dimension and shape suitable for a space frequency in each portion of the input image by using a simple evaluation standard or objective function showing the space frequency of the input image.

The third purpose of the invention is to provide a movement vector detection apparatus having high space resolution by effective use of the space gradient information of image. The apparatus suitably, automatically sets a movement vector operation area in response to a space frequency of the input image so that it can securely eliminate a great error vector in an undistinguishably patterned region.

The fourth purpose of the invention is to provide a movement vector detection apparatus which can determine a block boundary by a simple objective function so as to determine a block at a high speed. In addition, the apparatus increases the detection precision, since it easily eliminates from computation a sign change region of the space gradient as a spacing between blocks. The conventional time space gradient method is not well applied in such a sign change region.

According to a preferred embodiment of the present invention to attain these purposes, there will be disclosed a movement vector detection apparatus to suitably, automatically determine in a simple method an optimum block suitable for a space frequency of the image, which has detection means for detecting a movement vector of the image from a change in image density within a determined time at a position of the image and from a space gradient of an image signal at the image position, and setting means for suitably setting a dimension and a shape of unit operation area outputting the movement vector in response to the space frequency of the input image.

The fifth purpose of the present invention is to provide a matching method movement vector detection apparatus which can suitably, automatically determine in a simple method a block suitable for a space frequency of the image.

The sixth purpose of the present invention is to provide a matching method movement vector detection apparatus which can automatically set a detection area of optimum dimension and shape suitable for a space frequency of each portion of input image by establishing a simple evaluation standard or objective function to show the space frequency of input image.

According to a preferred embodiment of the present invention to attain these purposes, there will be disclosed a movement vector detection apparatus for detecting a movement vector from an image signal, which has area setting means for suitably, automatically setting a dimension and a shape of a unit operation area outputting a movement vector in response to a space frequency of an input image, and movement vector detection means for detecting the movement vector of an image either by a correlation function operation or by a matching operation between chronologically sequential images from the image signal in the unit operation area set by the area setting means.

Another purpose of the present invention is to provide a video camera with a vibration correction function which detects and corrects a vibratory motion of an image by the above movement vector detection apparatus.

Other purposes and specific features of the present invention will be clarified by the following details and drawings.

DETAILED DESCRIPTION OF THE PREFERRED EMBODIMENTS

Preferred embodiments of the present invention are detailed below with reference to the drawings.

Figure 1:
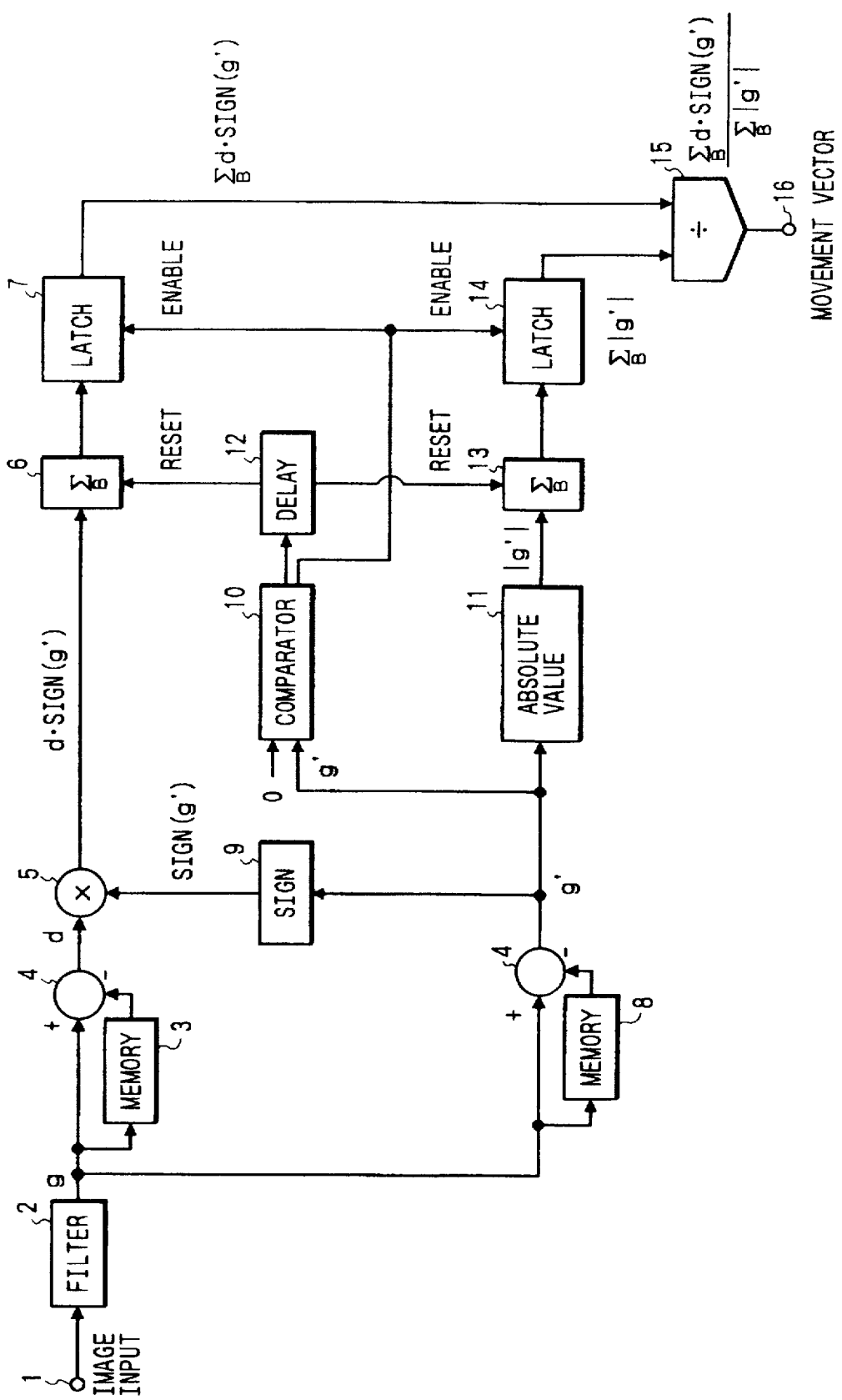
FIG. 1 is a block diagram to show a structure of the first embodiment of a movement vector detection apparatus of the present invention.

FIG. 1 is a block diagram showing an embodiment of an image pick-up device of the present invention.

In FIG. 1, 1 denotes an input terminal of image signal, 2 denotes a preliminary processing filter composed of a low pass filter to effect preliminary processing of input signal, 3 denoted a memory to store an image signal either during one field or during one frame, 4a denotes a substractor to compute an image density difference at corresponding positions either between two sequential fields or between two sequential frames, 5 denotes a multiplier, 6, 13 denote summation circuits to sum up consecutive input data until a reset signal is received, 7, 14 denote latch circuits to hold the input data input from the summation circuits 6, 13, respectively until an enable signal is received, 8 denotes a memory to store the image signal during a period necessary for operation of the space gradient of an image, 9 denotes a sign output circuit to output only data about the sign of the input signal, 10 denotes a comparator to compare the input data with zero, 11 denotes an absolute value output circuit to obtain the absolute value of the space gradient of an image, 12 denotes a delay circuit to produce a time difference between the reset and the enable signals, 15 denotes a divider, and 16 denotes a movement vector output terminal.

Explained below is an operation of the circuit as shown in FIG. 1.

An image signal entering the image signal input terminal 1 is supplied to the preliminary processing filter 2 commonly composed of a low pass filter, where processes are effected to decrease the influence of noises in the image signal and to smooth steep space gradients. After passing the filter 2, the image signal is divided into two. One signal is supplied to the memory 3 and the subtracter 4. The image signal is delayed by a determined time through the memory 3. The subtracter 4 subtracts the delayed signal from the image output signal of the filter 2. Accordingly, a density difference or time gradient d is obtained between two chronologically sequential images.

The time gradient d of image output from the subtractor 4 is input into the multiplier 5, then multiplied by the sign output from the sign output circuit 9, and further input into the summation circuit 6.

The input data from the multiplier 5 into the summation circuit 6, d·sign(g'), is summed up until a reset signal enters the circuit 6. Upon the entrance of the reset signal, the sum signal is supplied to the latch circuit 7 and then to the divider 15 as a numerator for the division operation.

The other output from the filter 2 is supplied to the memory 8 and the subtracter 4. The image signal delayed through the memory 8 is subtracted from the filter output, so that a space gradient of the image, g', is obtained. The image space gradient g' is further divided into three: one to the sign output circuit 9 to multiply the time gradient d by the sign of the space gradient; another to the comparator 10 to gain a timing for supplying the reset and the enable signals to the summation circuits 6, 13 and the latch circuits 7, 14, respectively; and the other to the absolute value circuit 11 to obtain its absolute value, then to the summation circuit 13 to be summed up until the reset signal is received from the comparator 10, further to the latch circuit 14, and finally to the divider 15 as a denominator for the division operation.

In the divider 15, a movement vector of the image is obtained by dividing the summation in the detection block of d·sign(g'), which is gained by multiplying the latched time gradient d in the latch circuit 7 by the sign (g') output from the sign output circuit 9, by the summation of the absolute value of the space gradient |g'| in the detection block.

In the comparator 10, the space gradient of the image g' is compared with zero, and then the reset and the enable signals are generated when the gradient g' becomes either equal to zero or nearly equal to zero.

The reset signals must be generated after the enable signals by the time during which the latched data in the latch circuits 7, 14 can enter the divider 15. Therefore, the signal from the comparator 10 passes through the delay circuit 12 to attain the delay of the above time. The delayed signal is supplied to the summation circuits 6, 13 as the reset signal.

Described above was the structure and the operation of the movement vector detection apparatus of the present invention. Its characteristic, operational effects are explained below.

Figure 2:
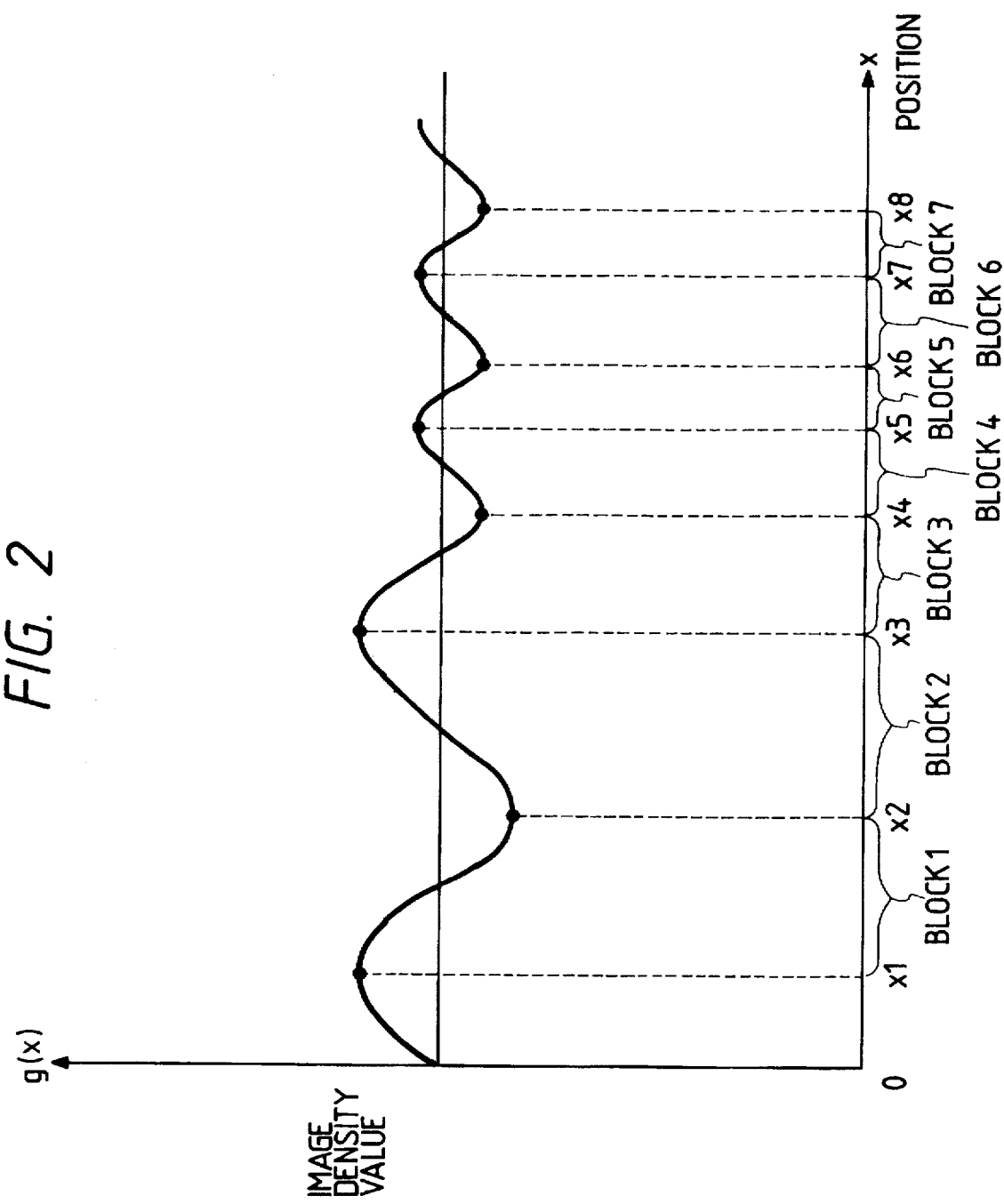
FIG. 2 is a diagram to illustrate a method to determine a block boundary using a space gradient of image.

FIG. 2 shows an arbitrary section of an image. The ordinate represents an image density value and the abscissa a position in the image.

Characters $x_1, x_2, x_3, \ldots, x_8$ on the abscissa correspond to points where $g'_{(x_1)} \cong g'_{(x_2)} \cong \ldots \cong g'_{(x_8)} \cong 0$. Suppose that a block boundary is a point where the space gradient of the image is either equal to or nearly equal to zero. Then, block 1 can be set between $x_1$ and $x_2$, block 2 between $x_2$ and $x_3$, and so on. In this manner, an optimum block size and two-dimensional shape may be automatically determined in response to a space frequency of the image.

A half of the image period T is assigned as a block size in FIG. 2. It is also possible to assign a fall image period T as a block size.

Using the above method, the great error vector, which occurs in the low frequency region and was a problem in the conventional methods, can be eliminated if a large block size is employed in the low frequency region lacking sufficient of space gradient information for the time space gradient method.

On the other hand, a small block size may be applied to the high frequency region having sufficient space gradient information, so that redundant space gradient information, which may occur in a block of fixed dimension and shape in the conventional methods, may be effectively reduced. As a result, a high space resolution may be attained.

Furthermore, the present invention allows one to exclude the area of a near-zero space gradient from the operation region of the time space gradient method if the block boundary is set at the near-zero space gradient. Such a near-zero space gradient area usually provides extremely poor information of the space gradient, or, even in the case of having rich information of the space gradient, corresponds to a region where the sign of space gradient is reversed. Since the time space gradient method is theoretically weak in such a region, the region may be automatically eliminated by setting the region as a spacing between two blocks.

As described above, the present invention attains optimization of a detection block of space gradient information in response to a space gradient of an input image, increasing the precision of movement vector detection.

In the above embodiment, the boundary of the detection block was determined by using the space gradient of the image. The second embodiment as explained below shows another automatic setting method to set a suitable dimension and shape of a block in response to the space frequency of an input image signal, using a density difference between two sequential images.

Figure 3:
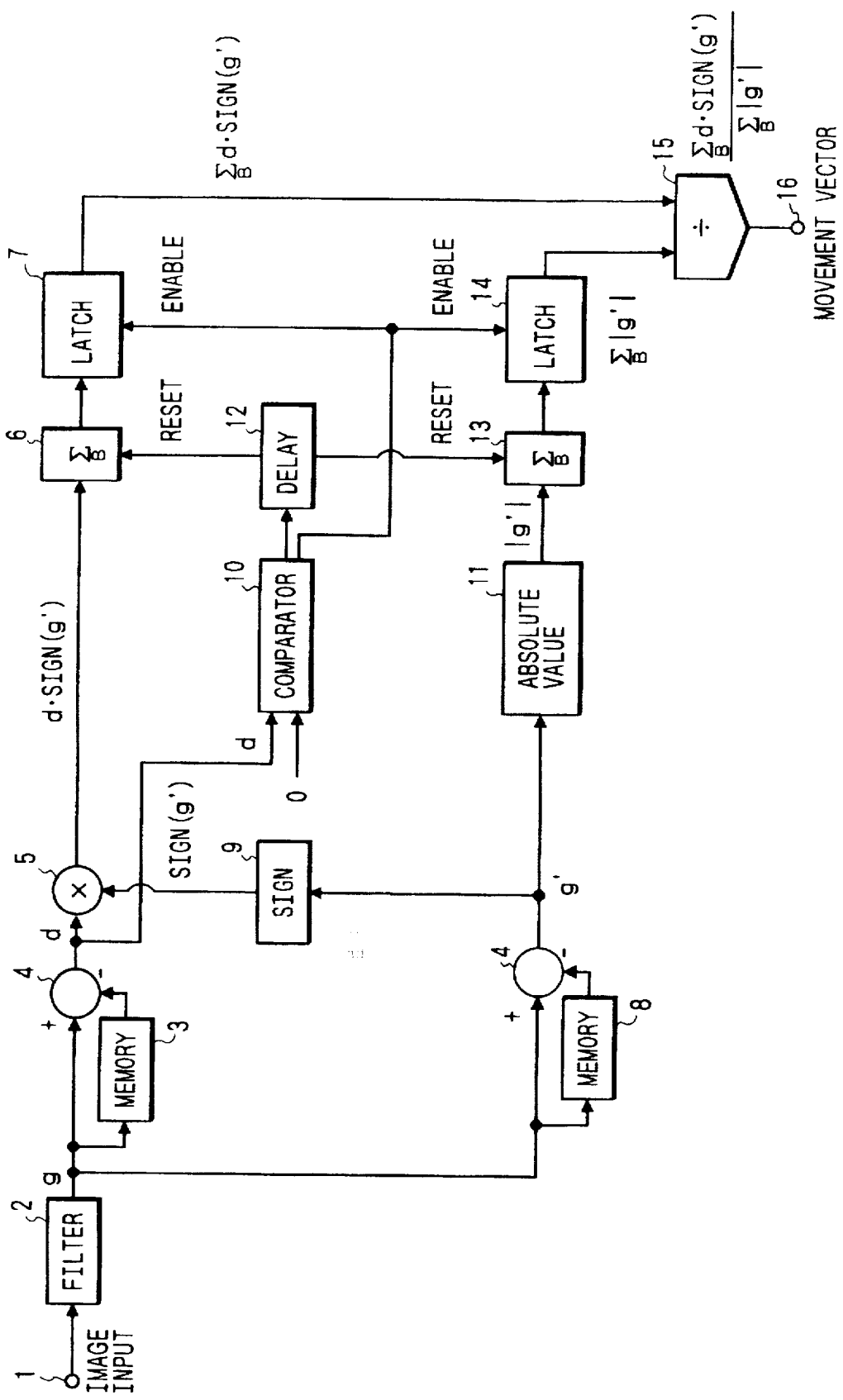
FIG. 3 is a block diagram to show a structure of the second embodiment of movement vector detection apparatus of the present invention.

FIG. 3 illustrates the second embodiment, differing in inputting an input signal into a comparator 10 from the first embodiment as shown in FIG. 1. In the second embodiment, a density difference or time gradient d between sequential images is computed by a memory 3 and a subtractor 4, and is supplied to the comparator 10 to compare the time gradient with zero. When the time gradient becomes either equal to or nearly equal to zero, a reset signal is sent to a summation circuit 6 via a delay circuit 12, and an enable signal to a latch circuit 7.

Figure 4:
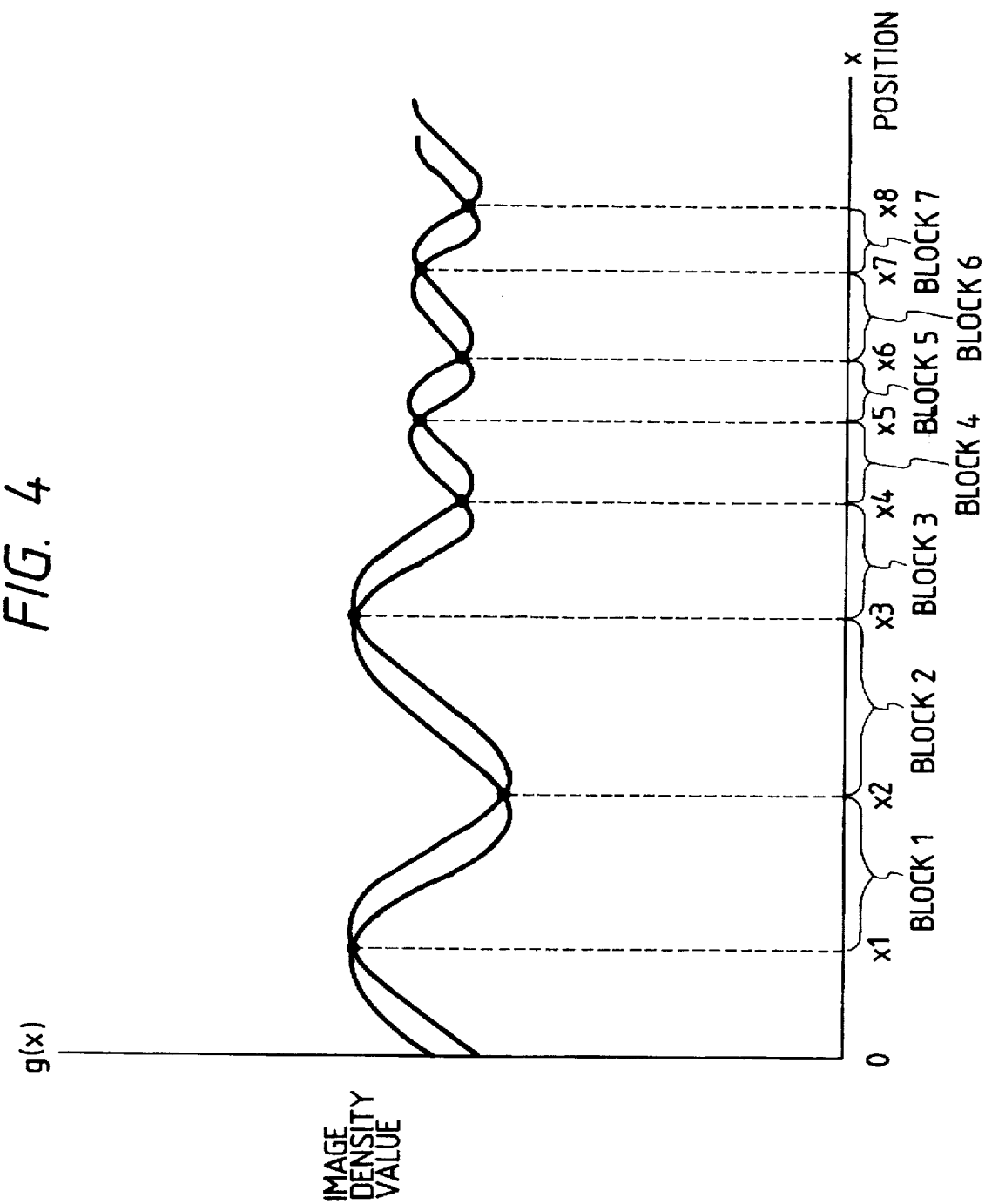
FIG. 4 is a diagram to illustrate a method to determine a block boundary using a time gradient of the image.

FIG. 4 illustrates a manner of operation of the embodiment. The ordinate represents an image density value and the abscissa represents a position in an image.

In FIG. 4, characters $x_1, x_2, \ldots, x_8$ represent points where the time density difference between chronologically sequential images, or the time gradient d, becomes zero. Suppose that a boundary of a block is set at each point of $x_1, x_2, \ldots, x_8$. This automatically determines the optimum block dimension and two-dimensional shape in response to a space frequency of the image.

The embodiment as shown in FIG. 4 shows the manner in which it defines a boundary at d=0. It is also effective to define a boundary at every other zero point, d=0. That is, a block corresponds to a period T of the image.

In case that a block boundary is set at a near-zero point of the time gradient d in the present invention, the region where the time gradient d is nearly zero is eliminated from the operation area of the time space gradient method.

Such a region often provides little information of the space gradient. Even if the space gradient information is sufficient, the sign of the space gradient may change in such a region. The time space gradient method is theoretically weak in this region. The present invention automatically eliminates this region from the operation area as a spacing between the blocks.

The movement vector detecting apparatus of the present invention is structured as explained above. Explained next is an example of the movement vector detecting apparatus being applied to a vibratory motion correction device in a video camera.

Figure 5:
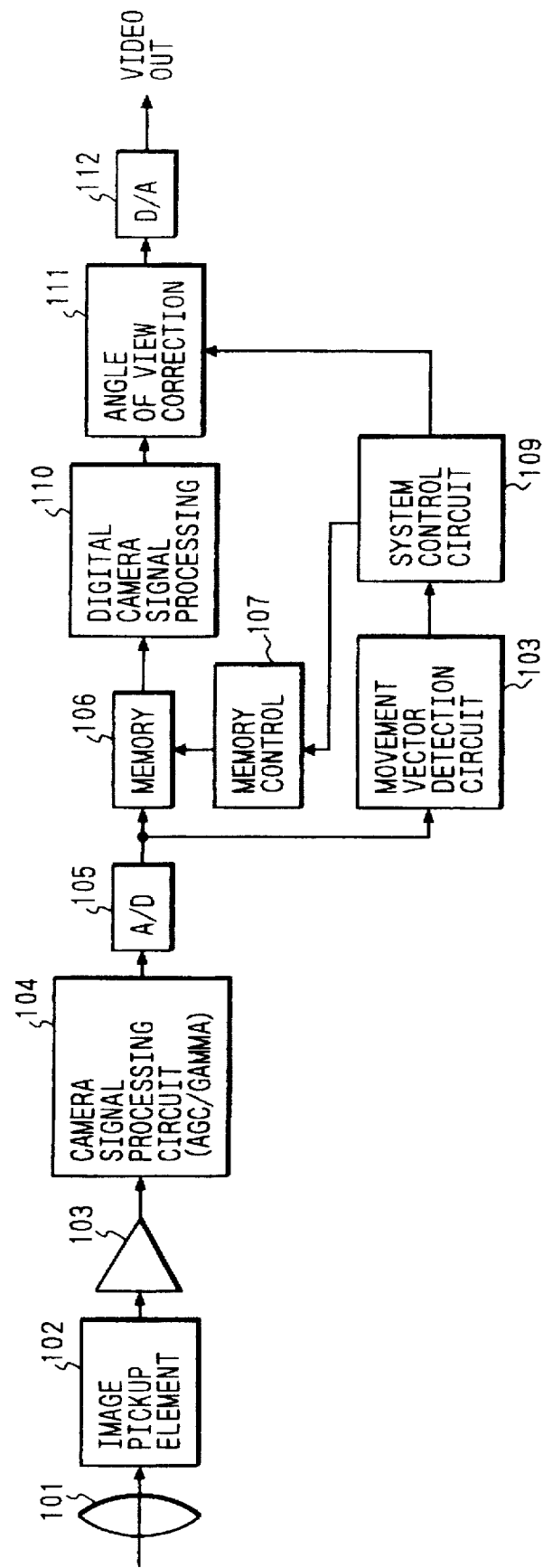
FIG. 5 is a block diagram of the third embodiment to show an application of the movement vector detection apparatus of the present invention to a vibration correction apparatus of a video camera.

FIG. 5 is a block diagram to illustrate the third embodiment where the movement vector detecting apparatus of the present invention is used for a vibratory motion correction device of a video camera.

In FIG. 5, 101 denotes a photographing lens optical system, 102 denotes an image pickup element such as a CCD to output a photoelectrically converted image signal of a subject image focused on an image pickup screen by the photographing lens system 101, 103 denotes a preamplifier to amplify up to a determined level the image signal output from the image pickup element 103, 104 denotes a camera signal preliminary processing circuit to apply AGC to the input image signal to hold a constant level thereof and to effect camera signal processing such as gamma control, 105 denotes an A/D converter to convert the input analog image signal to a digital image signal, 106 denotes an image memory to store at least one field of the digital image signal output from the A/D converter 105, 107 denotes a memory control circuit to control an address, an A/D conversion rate and a write-in rate upon reading the image into the image memory 106 and to control a read-out address and a read-out rate upon reading the image out of the image memory 106. The operation of the memory control circuit 107 is controlled by a system control circuit 109 as explained later.

Further, 108 is a movement vector detecting circuit to detect a movement vector of an image from the image signal. The inner structure and the operation of the circuit 108 are shown in FIGS. 1 and 3. It should be, however, noted that the processing is conducted by the digital signal.

Number 109 denotes the system control circuit to totally control the present device. The system control circuit 109 comprises a microcomputer to compute a movement direction and a movement amount of the image from the movement vector information obtained in the movement vector detecting circuit 108, and to compute vibration correction information to correct the vibratory motion. Further, the circuit 109 controls the memory control circuit 107 based on the above operation result to control the read-out out of the memory 106 so as to kill the vibratory motion by shifting the read-out position or address in the memory in the direction of the vibratory motion. That is, the memory is given an image of a wider angle of view than the output image, and the read-out region is varied on the memory upon the read-out to correct the motion. The read-out region is shifted in the direction of the motion so that the movement of the image is corrected effectively.

Number 110 denotes a digital camera signal processing circuit to effect predetermined signal processing on the read-out image signal from the memory 106 to convert the signal into a normalized image signal, and 111 denotes an angle-of-view correction circuit controlled by the system control circuit 109 to correct the angle of view of the image read-out of the memory 106. Since the read-out position of image was shifted in the memory 106 for the vibration correction, the read-out image has a smaller angle of view by the shift in the memory than the input image of the memory. Therefore, the angle-of-view correction circuit 111 conducts processing of the magnification of the view angle and compensation of the image so that the image has the same angle of view as one before the vibration correction.

The signal after the view angle correction is converted into an analog image signal by a D/A converter 112, and then supplied to an unshown monitor of video recorder, electronic view finder or the like. The signal may be output as a digital video output signal without the use of the D/A converter 112.

By the above arrangement, the vibration correction is so attained that the amount of vibratory motion is detected by obtaining the movement vector using the embodiments as shown in FIGS. 1 and 3, and then the read-out address is shifted in a direction to kill the vibration amount.

The above arrangement may be modified to place the camera signal processing circuit after the D/A converter 112. The digital signal processing is more advantageous for the processing and in a sense of noises.

Figure 6:
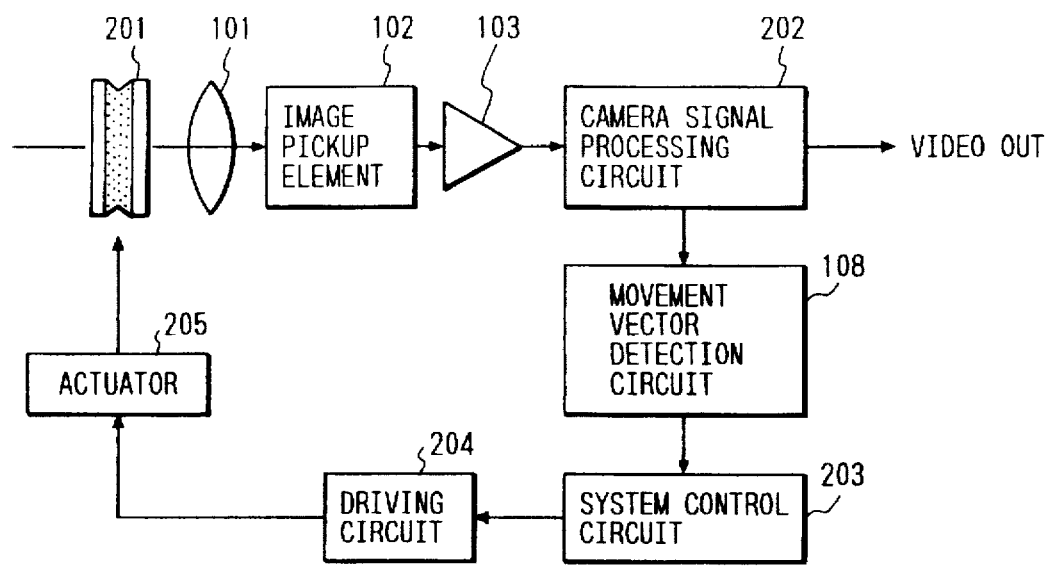
FIG. 6 is a block diagram of the fourth embodiment to show another application of the movement vector detection apparatus of the present invention to a vibration correction apparatus of a video camera.

FIG. 6 is a block diagram to illustrate another example of a video camera with a vibratory motion correction device using the movement vector detecting circuit of the present invention. The same components as in FIG. 5 have the same numbers and are omitted.

In FIG. 6, 201 is a variable vertical angle prism to correct a vibratory motion by varying the vertical angle or direction of the optical axis thereof. One example of the prism is an arrangement that silicone base liquid is sealed between two parallel glass plates to make variable the angle therebetween or the vertial angle.

Number 202 is a camera signal processing circuit to output a normalized image signal converted from the output signal of the preamp, and 203 denotes a system control circuit comprising a microcomputer to detect a direction and an amount of vibratory motion from the movement vector information supplied from the movement vector detecting circuit 108 and to compute an amount of driving of the variable vertical angle prism for the vibration correction. The correction information computed in the circuit 203 is supplied to the drive circuit 204, and an actuator 205 to vary the prism is driven in a direction and by the amount to kill the vibratory motion. As above, the vibration correction is so attained that the vibration amount is computed by detecting the movement vector from the image signal, and further the variable vertical angle prism is driven in a direction to correct the amount of vibratory motion.

In either of the above embodiments, a movement vector operation region is suitably and automatically set in response to a space frequency of an input image. This allows the elimination of a large error vector even in an area of an undistinguishable pattern, which, in turn, leads to high space resolution with effective use of the space gradient information of the image. The detection precision may increase by eliminating from the operation region the sign changing area of the space gradient as a spacing between the detection blocks, since the time space gradient method is not well applied therein. Therefore, the vibration correction may be attained with high precision and secure operation.

As explained, the movement vector detecting circuit of the present invention attain the vibration correction of in a video camera. In addition the vibration correction, many applications may be considered using such movement detection, for instance, panning detection of a camera and the like.

The present invention permits production of a video camera with a high performance vibration correction device which has a very wide range of movement detection and can perform the detection and the correction of various movements.

As explained, the movement vector detecting apparatus of the present invention is arranged to suitably and automatically set the movement vector operation region in response to the space frequency of an input image, so that a large error vector may be securely eliminated in the area of an undistinguishable pattern and so that high space resolution may be obtained effectively using the space gradient information of the image.

Also, the block boundary is determined by a simple objective function, so that the block may be defined at a high speed.

The sign changing area of the space gradient, where the conventional time space gradient method is weak, may be readily eliminated as a spacing between the blocks, so that the detection precision may be increased.

The above embodiments are examples in which the movement vector detecting apparatus of the present invention employs the movement vector detection of the time space gradient method. The next example shows the movement vector detection using the block matching method.

Figure 7:
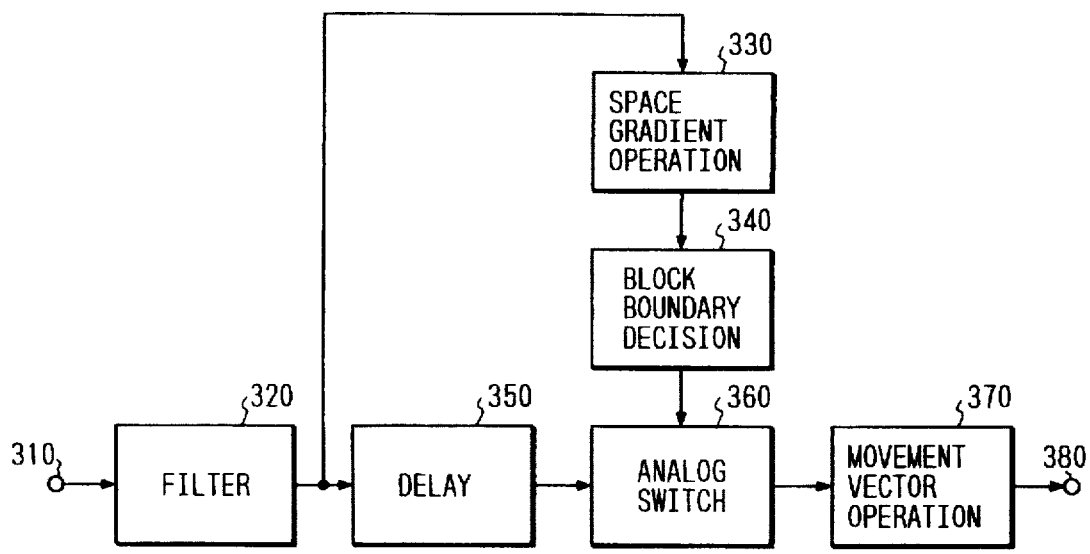
FIG. 7 is a block diagram to show a structure of the fifth embodiment of a movement vector detection apparatus of the present invention.

FIG. 7 is a block diagram to show the fifth embodiment, suitably applicable for the image pickup means of a video camera, an electronic camera or the like, where the present invention is applied to the movement vector detecting apparatus of the matching method.

In FIG. 7, 310 is an input terminal, 320 denotes a preliminary processing filter before the movement vector operation, 330 denotes a circuit for computing a space gradient of an image, 340 denotes a boundary determination circuit to determine a boundary of block, 350 denotes a delay circuit to adjust the timing with respect to the operation time of the space gradient operation circuit 330 and the block boundary determination circuit 340, 360 denotes an analog switch which is controlled to open or close by the output from the circuit 340, 370 denotes a movement vector operation circuit of the correlation function operation, and 380 denotes an output terminal to output a signal of the final movement vector.

Figure 8:
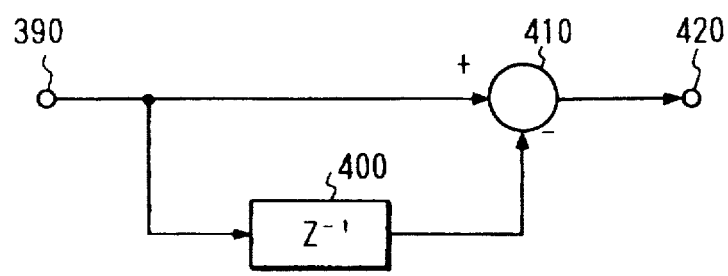
FIG. 8 is a block diagram to show a circuit structure to obtain a gradient in the horizontal direction.

The image signal input into the input terminal 310 passes through the preliminary processing filter 320 to eliminate a component of the space frequency unfit for the correlation function operation or matching operation, e.g. a component of extremely high space frequency and a component of low frequency close to a direct current. After passing the preliminary processing filter 320, the image signal is separated to the space gradient operation circuit 330 and to the delay circuit 350. The vertical and the horizontal space gradients are computed in the space gradient operation circuit 330. FIG. 8 depicts an example of a simple circuit arrangement to operate the horizontal space gradient. In FIG. 8, an image signal enters an image signal input terminal 390. A branched image signal passes through a latch 400 to be delayed by a time of one pixel. A subtractor 410 subtracts the delayed signal from the first input signal. The difference after the subtraction is output from an output terminal 420. This means that a luminance difference is obtained between two horizontally adjacent pixels.

Figure 9:
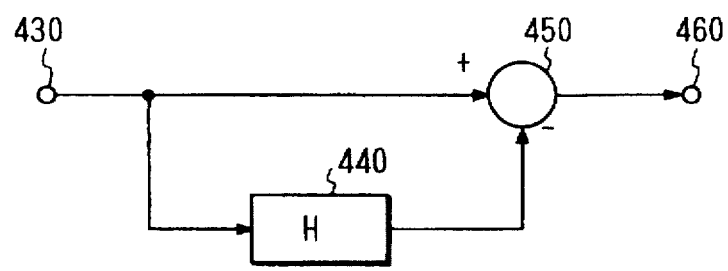
FIG. 9 is a block diagram to show a circuit structure to obtain a gradient in the vertical direction.

FIG. 9 shows an example of a simple circuit arrangement to operate the vertical space gradient. An image signal enters an image signal input terminal 430. A branched image signal passes through a line memory 440 to be delayed by the time of one scan line. A subtracter 450 subtracts the delayed signal from the first input signal. The difference after the subtraction is output from an output terminal 460. This means that a luminance difference is obtained between two vertically adjacent pixels.

The block boundary determination circuit 340 stores positions where the luminance difference computed at the space gradient operation circuit 330 becomes zero or below a predetermined threshold value. Then the circuit 340 connects the positions to form a closed area or block. The analog switch 360 controls the apparatus to perform the difference addition operation for the correlation operation within the block determined by the block boundary determination circuit 340.

The movement vector operation circuit 370, under the control of the analog switch 360, computes a movement vector by the correlation function operation or matching operation. The computed movement vector is output from the output terminal 380.

The fifth embodiment of the movement vector detecting apparatus is arranged as explained above, and has the same operation as the first embodiment as detailed referring to FIG. 2. In summary, the image signals $g'_{(x_1)} \cong g'_{(x_2)} \cong \cdots \cong g'_{(x_8)} \cong 0$ at points $x_1, x_2, \ldots, x_8$ on the abscissa, a boundary is set at a point where the space gradient of image is equal to or nearly equal to zero, and then block 1 is assigned between $x_1$ and $x_2$, block 2 between $x_2$ and $x_3$, and so on. The dimension and the two-dimensional shape of an optimum block is automatically determined in response to the space frequency of the image.

The block size can be chosen as in FIG. 2, i.e. a half of the image period T. However, a full image period T may be also used as the block size.

The block size may be enlarged in a low frequency area providing little image information necessary for the correlation function operation or matching operation. By this arrangement, a large error vector, which was a problem in the conventional methods, may be eliminated in the low frequency area. Furthermore, the block size may be set to be smaller in the high frequency area providing sufficient information, so that redundant space gradient information, which occurs in the conventional methods employing a fixed block size, may be reduced. As a result, high space resolution is attained.

The above embodiment illustrates an example using the space gradient of an image for the block boundary determination means. The next embodiment shows another method using the density difference or time gradient between two consecutive images, which also attains the automatic setting of the dimension and the shape of the input image signal.

Figure 10:
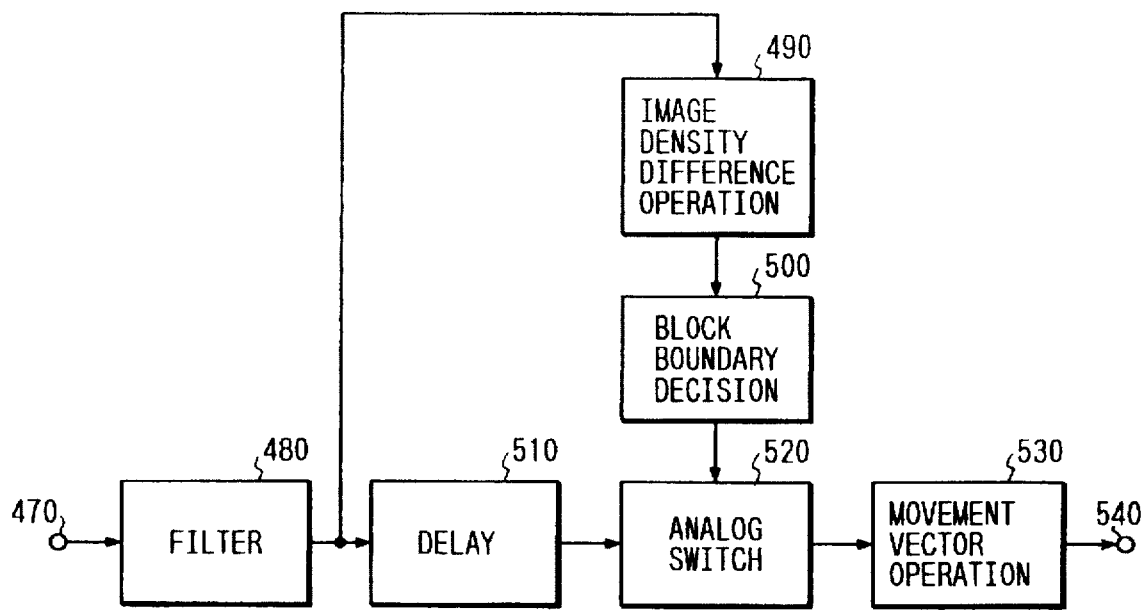
FIG. 10 is a block diagram to show a structure of the sixth embodiment.

FIG. 10 shows the sixth embodiment of the present invention. The sixth embodiment is different from the fifth embodiment as shown in FIG. 7 only in operation of an image density difference operation circuit 490 which is used as a basis to determine a block boundary in a block boundary determination circuit 500.

Figure 11:
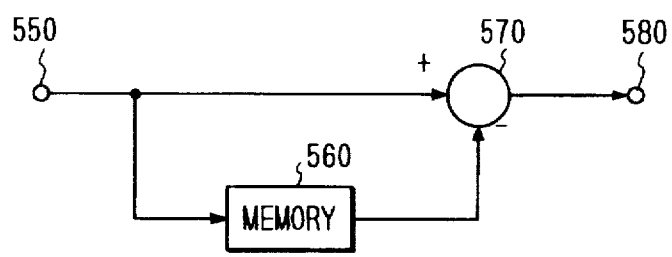
FIG. 11 is a circuit structure diagram to obtain a density difference between two images.

FIG. 11 is an example of simple arrangement of a circuit to obtain the density difference or time gradient between two chronologically sequential images. An image signal enters an input terminal 550. A branched signal passes through a memory 560 to be delayed by one picture. A subtracter 570 subtracts the delayed signal from the first input signal. The difference is output from an output terminal 580. The data holding time of the memory 560 is, for example, 1/60 sec. for the field processing and 1/30 sec. for the frame processing of NTSC. Since the boundary is set at the point where the density difference is equal to zero or below the predetermined value, the optimum block shape is determined in response to the space frequency of each portion of the input image.

The relation between the detection block and the image signal is the same as in FIG. 4. The density difference or time gradient d becomes zero at each of $x_1, x_2, \ldots, x_8$ on the abscissa. When the block boundary is set at each point of $x_1, x_2, \ldots, x_8$, the dimension and the two-dimensional shape of the optimum block are automatically determined in response to the space frequency of the image. FIG. 4 shows an example in which the block is defined by every point of d=0. It is also possible to define the block using every other point of d=0, where one block corresponds to one period T of an image. It should be noted that this embodiment is also applicable to a vibration-proof device or the like of a video camera, as shown in FIGS. 5 and 6.

As detailed above, the movement vector detecting apparatus of the present invention suitably and automatically sets the dimension and the shape of block for the movement vector detection area in response to the space frequency of input image, so that a large error vector may be eliminated in an undistinguishably patterned area of low space frequency, and that a high space resolution may be attained by effective use of the space gradient information of an image. Moreover, the block boundary is determined by a simple objective function to realize high speed processing of the block setting operation.

What is claimed is:

1. A movement vector detection apparatus comprising:
   means for forming a plurality of movement vector detection blocks in an input image by determining a dimension and/or a shape of each of the vector detection blocks in the input image;
   controlling means for adaptively changing a dimension and/or shape of each of the blocks formed by said forming means in accordance with a spatial frequency of the input image; and
   detection means for detecting a movement vector on the basis of a relation between the amount of change in an image density value in a predetermined time and a space gradient of an image signal of each of the plurality of blocks.

2. A movement vector detection apparatus according to claim 1, where said for forming means is arranged to determine a boundary of the areas by using the spatial gradient of the input image.

3. A movement vector detection apparatus according to claim 1, where said means for forming is arranged to determine a boundary of the areas by using a density different between chronologically sequential images.

4. An apparatus for detecting a movement vector for an image signal of an input image, comprising:
   means for defining a plurality of movement vector detection blocks in an input image, each of said plurality of blocks having a dimension and/or a shape;
   controlling means for adaptively changing a dimension and/or a shape of each of said plurality of areas on the basis of a spatial frequency of the input image; and
   movement vector detecting means for detecting the movement vector in each of said plurality of blocks by effecting a correlation function operation or a matching operation between time-serial sequential images in said blocks.

5. A movement vector detection apparatus according to claim 4, where said means for dividing is arranged to determine a boundary of said plurality of areas based on a spatial gradient of image.

6. A movement vector detection apparatus according to claim 4, where said means for dividing is arranged to determine a boundary of said plurality of areas based on a time gradient represented by a density difference between chronologically sequential images.

7. An image pickup apparatus comprising:
   image pickup means for photoelectrically converting an image focused on an image pickup plane, into an image pickup signal;
   movement vector detection area setting means for setting a plurality of movement vector detection areas on said image pickup plane, wherein a dimension of each of said plurality of movement vector detection areas can be variably set;
   control means for controlling said area setting means according to a spatial frequency of said image pickup signal output from said image pickup means so as to change and set the dimension of each of said plurality of movement vector detection areas according to said spatial frequency;
   movement vector processing means for providing a movement vector by extracting an image signal in each of said plurality of movement vector detection areas; and
   output means for outputting movement information representative of relative movement between said apparatus and said image, according to said movement vector provided by said movement vector processing means.

8. An apparatus according to claim 7, wherein said control means sets the dimension of the movement vector detection area to be smaller when the spatial frequency of the image signal of that area is high, and sets the dimension of the movement vector detection area to be larger when the spatial frequency of the image signal of that area is low.

9. An apparatus according to claim 8, wherein said control means determines boundaries of said plurality of movement vector detection areas on the basis of a spatial gradient in said image pickup signal.

10. An apparatus according to claim 9, wherein said control means determines a point where the value of the spatial gradient in said image pickup signal is substantially zero, as boundaries of said plurality of movement vector detection areas.

11. An apparatus according to claim 8, wherein said control means determines a boundary of said plurality of movement vector detection areas based on a time gradient of said image pickup signal.

12. An apparatus according to claim 11, wherein said control means determines a point where the value of the time gradient in said image pickup signal is substantially zero, as boundaries of said plurality of movement vector detection areas.

13. An apparatus according to claim 12, further comprising movement correction means for offsetting a relative movement between said apparatus and said image based on said movement vector.

14. An apparatus according to claim 13, wherein said movement correction means comprises optical correction means.

15. An apparatus according to claim 14, wherein said movement correction means comprises a variable vertical angle prism.

16. An apparatus according to claim 13, wherein said movement correction means comprises electronic correction means for electronically correcting said relative movement.

17. An apparatus according to claim 16, wherein said movement correction means comprises (i) an image memory for storing an image of one picture, and (ii) a memory control circuit for shifting a read-out range of said image memory on the basis of said movement vector.

18. An apparatus according to claim 17, wherein said read-out range is set to be smaller than one picture area, and wherein said apparatus further comprises expansion means for expanding image information which is read out of said image memory into one picture.

19. An apparatus according to claim 7, wherein said movement vector processing means provides the movement vector based on (i) a time gradient which is representative of a change of images in pictures of a plurality of fields, and (ii) a spatial gradient representative of a difference of density in the image of one picture.

20. An apparatus according to claim 19, further comprising movement correction means for offsetting a relative movement between said apparatus and said image based on said movement vector.

21. An apparatus according to claim 20, wherein said movement correction means comprises optical correction means.

22. An apparatus according to claim 21, wherein said movement correction means comprises a variable vertical angle prism.

23. An apparatus according to claim 20, wherein said movement correction means comprises electronic correction means for electronically offsetting said relative movement.

24. An apparatus according to claim 23, wherein said movement correction means comprises (i) an image memory for storing an image of one picture, and (ii) a memory control circuit for shifting a read-out range of said image memory on the basis of said movement vector.

25. An apparatus according to claim 24, wherein said read-out range is set to be smaller than one picture area, and wherein said apparatus further comprises expansion means for expanding image information which is read out, into one picture.

26. An image processing apparatus for processing image signals output from an image pickup device, comprising:
   area setting means for setting a plurality of movement vector detection areas on a picture, wherein a dimension and/or a shape of each of said plurality of movement vector detection areas can be variably set;
   control means for controlling said area setting means on the basis of a spatial frequency of image signals in each of said plurality of movement vector detection areas so as to change and set the dimension of each of said plurality of detection areas on the basis of said spatial frequency;
   movement vector processing means for providing a movement vector by processing the image signal in each of said plurality of movement vector detection areas; and
   movement correction means for correcting a movement of the picture on the basis of the movement vector provided by said movement vector operation means.

27. An apparatus according to claim 26, wherein said control means sets the dimension of the movement vector detection area to be smaller when the spatial frequency of the image signal of that area is high, and sets the dimension of the movement vector detection area to be larger when the spatial frequency of the image signal of that area is low.

28. An apparatus according to claim 27, wherein said control means determines boundaries of said plurality of movement vector detection areas on the basis of a spatial gradient of said image signals.

29. An apparatus according to claim 28, wherein said control means determines a point where the value of spatial gradient in said image signal is substantially zero, as a boundary of said plurality of movement vector detection area.

30. An apparatus according to claim 29, wherein said spatial gradient represents a difference between densities of adjacent pixels in one picture.

31. An apparatus according to claim 27, wherein said control means determines boundaries of said plurality of detection areas on the basis of a time gradient of said image signals.

32. An apparatus according to claim 31, wherein said control means determines a point where the time gradient in said image signal is substantially zero, as a boundary of the movement vector detection areas.

33. An apparatus according to claim 32, wherein said time gradient represents a difference between densities of images of a plurality of pictures.

34. An apparatus according to claim 26, wherein said movement vector processing means generates the movement vector utilizing a representation point matching method.

35. An apparatus according to claim 26, wherein said movement correction means comprises a variable vertical angle prism.

36. An apparatus according to claim 26, wherein said movement correction means comprises (i) an image memory for storing an image of one picture, (ii) a memory control circuit for shifting a read-out range of said image memory, which range is smaller than one picture, on the basis of said movement vector, and (iii) expansion means for expanding an image in the read-out range into one picture.

* * * * *

UNITED STATES PATENT AND TRADEMARK OFFICE
CERTIFICATE OF CORRECTION

| | | |
|---|---|---|
| PATENT NO. : | 5,734,441 | |
| DATED : | March 31, 1998 | |
| INVENTOR(S) : | TOSHIAKI KONDO, ET AL. | |

It is certified that error appears in the above-identified patent and that said Letters Patent is hereby corrected as shown below:

Title page,
<u>At [56] References Cited</u>

U.S. PATENT DOCUMENTS

Insert  --5,031,049   07/09/91   Toyoma et al.     358/227
         4,788,596   11/29/88   Kawakami et al.   358/222
         3,890,462   06/17/75   Limb et al.       178/6.8--.

"5,053,276  10/1991  Blissett et al." should read
--5,053,876  10/1991  Blissett et al.--.

FOREIGN PATENT DOCUMENTS

Insert  --1-178916   07/17/89   Japan
         60-46878    10/18/85   Japan
         0-310032    04/05/89   EPO
            0-393823  10/24/90  EPO--.

OTHER DOCUMENTS

Insert --J.O. Limb & J.A. Murphy, "Measuring the Speed of Moving Objects from Television Signals," IEEE Transactions on Communications, Com. 23, pp. 474-478, April 1975.

T. Matsuzura, et al. "A new Technique to Improve Video Stability by Digital Processing," SMPTE Journal, pp. 908-910, November 1988.--

UNITED STATES PATENT AND TRADEMARK OFFICE
CERTIFICATE OF CORRECTION

PATENT NO. : 5,734,441

DATED : March 31, 1998

INVENTOR(S) : TOSHIAKI KONDO, ET AL.

It is certified that error appears in the above-identified patent and that said Letters Patent is hereby corrected as shown below:

Column 1

Line 59, "5 and" should read --and--.

Column 2

Line 7, "shape" should read --the shape--.
Line 10, "brings" should read --bring--.
Line 24, "amounts" should read --difference amounts--.
Line 53, "provide" should read --provides--.

Column 3

Line 2, "automatically" should read --and automatically-.
Line 17, "automati-" should read --and automati- --.
Line 29, "automatically" should read --and automatically--.
Line 43, "automatically" should read --and automatically--.

Column 4

Line 33, "denoted" should read --denotes--.

Column 5

Line 61, "of" should be deleted.

UNITED STATES PATENT AND TRADEMARK OFFICE
CERTIFICATE OF CORRECTION

PATENT NO. : 5,734,441
DATED : March 31, 1998
INVENTOR(S) : TOSHIAKI KONDO, ET AL.

It is certified that error appears in the above-identified patent and that said Letters Patent is hereby corrected as shown below:

Column 7

Line 59, "compensation" should read --the compensation--.

Column 8

Line 9, before "noises" insert --reducing--.
    Line 19, "vertial" should read --vertical--.
    Line 49, "of" should be deleted and "attain" should read --attains--.

Column 10

Line 17, "i.e." should read --i.e.,--.

Column 11

Line 31, "for forming means" should read --means for forming--.
    Line 36, "areas" should read --blocks--.

Signed and Sealed this

Fifteenth Day of February, 2000

Attest:

Q. TODD DICKINSON

*Attesting Officer*      *Commissioner of Patents and Trademarks*